United States Patent Office 3,066,153
Patented Nov. 27, 1962

3,066,153
PROCESS FOR PREPARING HALO-
NAPHTHOQUINONES
Henry Bluestone, University Heights, Ohio, assignor to
Diamond Alkali Company, Cleveland, Ohio, a corporation of Delaware
No Drawing. Filed May 28, 1959, Ser. No. 816,370
5 Claims. (Cl. 260—396)

This invention relates to novel halogenated naphthoquinones, their preparation and application.

Compounds of this invention may be characterized as those having the following structural formula:

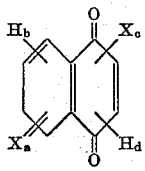

wherein X is halogen; $a=2$ to 4, inclusive; $b=4-a$; $c=0$ to 2, inclusive; and $d=2-c$.

Compounds of this invention are biologically active and useful in various biological applications, e.g., as fungicides, nematocides and the like.

Broadly, the compounds of this invention may be prepared by combining a halosubstitutedthiophene-1,1-dioxide compound of the structure

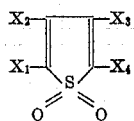

with benzoquinone according to the Diels-Alder reaction wherein $X_1$, $X_2$, $X_3$ and $X_4$ are selected from the group consisting of hydrogen and halogen, at least two of the X's being halogen.

Generally the reactants, with the quinone in excess, are combined usually in an organic solvent such as benzene, xylene, heptane and other inert solvents. Reaction temperature usually may be varied somewhat but generally the reaction advantageously is carried out at a temperature of about 65° to 70° C. until the desired halonaphthoquinone is formed. Formation of a compound wherein $c$ is greater than zero is accomplished by subsequent halogenation of the intermediate halonaphthoquinone, typically, although not necessarily, with the aid of a catalyst such as iodine, in the presence of an inert solvent such as an organic carboxylic acid, preferably glacial acetic acid.

The following equations will illustrate the preparation of two of the compounds contemplated by this invention:

(I)

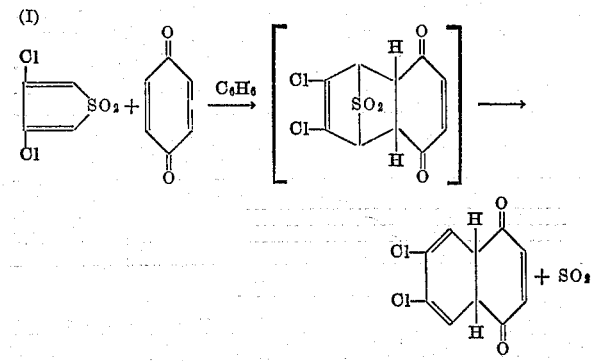

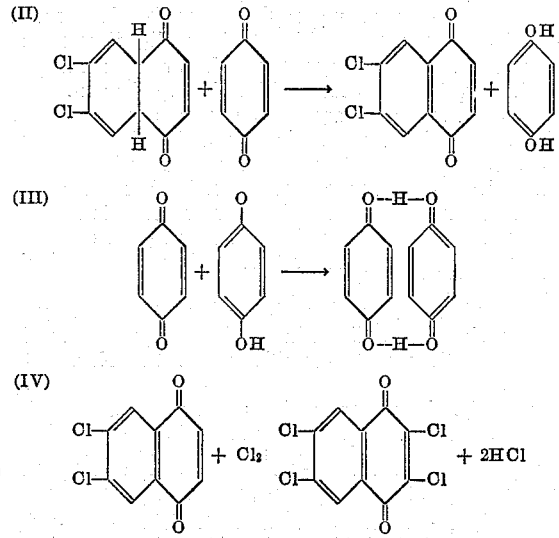

As indicated by Equation I, 3,4-dichlorothiophene 1,1-dioxide is reacted with p-benzoquinone in benzene solution to produce 6,7-dichloro-4a,8a-dihydro-1,4-naphthoquinone as an intermediate product, plus $SO_2$. According to Equation II, the organic product of Equation I is reacted with more p-benzoquinone to yield 6,7-dichloro-1,4-naphthoquinone and hydroquinone. The hydroquinone reacts with additional p-benzoquinone according to Equation III to produce quinhydrone as a precipitate. This material being soluble in alcohol may be separated from 6,7-dichloro-1,4-naphthoquinone by alcoholic extraction. The 6,7-dichloro-1,4-naphthoquinone may be chlorinated further by reacting it with chlorine gas as shown in Equation IV to produce 2,3,6,7-tetrachloro-1,4-naphthoquinone.

These compounds can be formulated into fungicidal compositions by mixing the active ingredient in a fungicidally active amount with a conditioning agent of the kind used and referred to in the art as a "pest control adjuvant" or modified to provide formulations adapted for ready and efficient application to soil or plants infected with fungi using conventional applicator equipment.

The fungicidal compositions are prepared in the form of solids or liquids. The solid compositions are preferably in the form of wettable powders and are compounded to give homogeneous free-flowing powders by admixing the active ingredient with finely-divided solids, preferably natural clays, diatomaceous earth, synthetic fine silica or flours, such as walnut shall, wheat, redwood, soya bean, cottonseed flours and other inert solid conditioning agents or carriers of the kind conventionally employed in preparing pest control compositions in solid or liquid form.

Even more preferable among solid compositions are granules or pellets when the application is primarily to the soil. Granules can be prepared by impregnating granular diluents such as granular Attaclay, or may be made by first extending powdered solids with powdered diluents and subsequently granulating. Pellets can be made by extruding moistened powdered mixtures under high pressure through dies.

Liquid compositions of the invention are prepared in the usual way by mixing the active ingredient with a suitable liquid diluent medium. The resulting composition can be in the form of either a solution or suspension of the active ingredient. The fungicidal compositions of the invention, whether in the form of solids or liquids, preferably also include a surface active agent of the kind sometimes referred to in the art as a "wetting, dispersing or emulsifying agent." These agents which will be referred to hereinafter more simply as "surface active agents" cause the composition to be easily dispersed in water to give aqueous sprays which for the most part constitute a desirable composition for application.

The surface active agents employed can be of the anionic, cationic or non-ionic type and include, for example, sodium and potassium oleate, the amine salts of oleic acid, such as morphylene and dimethyl amine oleates, the sulfonated animal and vegetable oils such as sulfonated fish and castor oils, sulfonated petroleum oils, sulfonated acyclic hydrocarbons, sodium salt of lignin sulfonic acid (goulac), alkyl naphthalene sodium sulfonate and other wetting, dispersing and emulsifying agents such as those listed in articles by McCutcheon in "Soap and Chemical Specialties," vol. 31, Nos. 7–10 (1955).

Generally, the surface active agent will not comprise more than about 5%–15% by weight of the composition, depending of course on the particular surface active agent, the system in which it is placed, the result desired, and, in certain compositions the percentage will be 1% or less. Usually the minimum lower concentration will be 0.1%.

The fungicidal compositions are applied either as a spray, a granule or a dust to the soil or to the plants directly to protect them from undesirable fungus growth. Such applications can be made directly upon the locus or area or the plants themselves during the period of fungus infestation in order to destroy the fungus, but if desired, the application can be made in advance of an anticipated fungus infestation to prevent such infestation. Thus, the compositions can be applied as aqueous foliar sprays but can also be applied as sprays or as granules directly to the surface of the soil. Alternatively, the dried powdered compositions can be dusted directly on the plants or on the soil.

The active compound is of course applied in an amount sufficient to exert the desired fungicidal action. The amount of the active ingredient present in the compositions as actually applied for destroying, preventing or controlling fungi will vary with the manner of application, the particular fungi for which control is sought, the purposes for which the application is being made and like variables. In general, the fungicidal composition, as applied in the form of a spray or granule, will contain from about 0.5% to 85% by weight of the active ingredient.

Fertilizer materials, other fungicidal agents, and other pest control agents such as insecticides, nematocides and herbicides can be included in the fungicidal or nematocidal compositions of the invention if desired.

In order that those skilled in the art may more completely understand the present invention and the preferred methods by which the same may be carried into effect, the following specific examples are offered.

EXAMPLE 1—PART A 400 g. (2.12 mol) of 3,4-dichlorotetrahydrothiophene 1,1-dioxide, prepared according to the method of Jordan and Kipnis, JACS 71, 1876 (1949), are mixed with 3 liters of carbon tetrachloride. This mixture is heated to reflux and exposed to a 100-watt mercury vapor ultra violet lamp in a quartz well immersed in the solution. While maintained at reflux, a total of 21.2 moles (1503 g.) of chlorine is introduced over a period of 11 hours. Dissolved chlorine is then removed by nitrogen purging and the solution cooled and filtered. The filter cake (crude 3,3,4,4-tetrachlorotetrahydrothiophene 1,1-dioxide) is dried overnight at 60° C., weighs 390.1 g. and melts at 174°–177° C. Recrystallization of the material from hot carbon tetrachloride solution produces a product which melts at 178.5°–179.5° C. and has the following chemical analysis:

| Element | Percent Theoretical | Percent Actual |
|---|---|---|
| C | 18.62 | 18.70 |
| H | 1.56 | 1.70 |
| Cl | 54.94 | 55.7 |

EXAMPLE 1—PART B

*Preparation of 3,4-Dichlorothiophene 1,1-Dioxide*

258 g. (1.0 mol) of 3,3,4,4-tetrachlorotetrahydrothiophene 1,1-dioxide is dissolved in 2 liters of methanol at room temperature. Aqueous ammonia (28%) (approximately 150 g.) is added portionwise to the methanol solution with stirring until the solution remains basic. The solution is cooled during the addition to maintain a temperature of 30°–35° C. The solution is allowed to stand to insure complete reaction, enough aqueous ammonia being added to maintain a basic solution.

One liter of distilled water is then added to the methanol solution and the methanol is distilled off at 20–25 mm. Hg pressure employing a water bath at about 40° C. The precipitated product is filtered off and washed with distilled water. After recrystallization from methanol, the product is dried in an evacuated desiccator yielding the desired $C_4H_2Cl_2O_2S$, which melts with decomposition at 112°–113° C. Preparation of the desired product is indicated by the following elemental analysis:

| Element | Percent Calculated | Percent Actual |
|---|---|---|
| C | 25.96 | 25.91 |
| Cl | 38.32 | 38.0 |

(This 3,4-dichlorothiophene 1,1-dioxide is greater than 5% soluble in acetone, cyclohexanone and xylene but less than 5% soluble in water.)

EXAMPLE 2

*Preparation of 6,7-Dichloro-1,4-Naphthoquinone*

A solution of 37 g. (0.20 mol) of 3,4-dichlorothiophene 1,1-dioxide and 108 g. (1.0 mol) of p-benzoquinone in 250 ml. of benzene is heated at 65°–70° C. for a period of 88 hours. Evolution of $SO_2$ is noted during this time. The solution is then distilled from the reaction mixture under reduced pressure from a water pump and the solid residue extracted with two 500 ml. portions of methanol and one 500 ml. portion of 95% ethanol. The reddish alcohol-insoluble product weighs 43.6 g., a 96% crude yield, and melts at 182°–184° C.

The crude 6,7-dichloro-1,4-naphthoquinone is dissolved in dry benzene at room temperature and filtered by gravity. The filtrate is then passed through a chromatographic column packed with desiccant grade silica gel (60–200 mesh) to remove an orange impurity and the column is eluted with dry benzene.

The solvent is distilled from the combined benzene solutions at 40° C. at a reduced pressure from a water pump and leaves the product (27.1 g., 60% yield) as pale yellow crystals having a melting point of 185°–186.5° C. Elemental analysis confirms the identity of the product.

| Element | Percent Calculated | Percent Active |
|---|---|---|
| C | 52.9 | 52.37, 52.41 |
| H | 1.78 | 1.92, 1.93 |
| Cl | 31.2 | 30.6, 30.6 |

EXAMPLE 3

Spore germination tests on glass slides are conducted via the test tube dilution method adopted from the procedure recommended by the American Phytopathological Society's committee on standardization of fungicidal tests. In this procedure, the product of Example 2 in aqueous formulations at concentrations of 1000, 100, 10 and 1.0 p.p.m. is tested for its ability to inhibit germination of spores from 7 to 10-day-old cultures of *Alternaria oleracea* and *Monilinia fructicola*. These concentrations refer to initial concentrations before diluting four volumes with one volume of spore stimulant and spore suspension. Germination records are taken after 20 hours of incubation at 22° C. by counting 100 spores. Results indicate that concentrations of 1.0–10 p.p.m. and 0.1–1.0 p.p.m. afford disease control for the *A. oleracea* and *M. fructicola*, respectively.

EXAMPLE 4

A tomato foliage disease test is conducted measuring the ability of the product of Example 2 to protect tomato foliage against infection by the early blight fungus *Alternaria solani*. Tomato plants 5 to 7 inches high of the variety Bonny Best are employed. The plants are sprayed with 100 ml. of test formulation at varying concentrations of the product of Example 2 in combination with 5% acetone-0.01% Triton X–155-and the balance water at 40 lbs. air pressure while being rotated on a turntable in a spray chamber. After the spray deposit is dry, the treated plants and comparable untreated controls are sprayed with a spore suspension containing approximately 20,000 conidia of *A. solani* per ml. The plants are held in a 100% humid atmosphere for 24 hours at 70° F. to permit spore germination and infection. After 2 to 4 days, lesion counts are made on the three uppermost fully expanded leaves. The disease control based on the number of lesions obtained on the control plants is given in the following table:

[Percent disease control at concentration p.p.m.]

| p.p.m. | 512 | 256 | 128 | 64 |
|---|---|---|---|---|
| Percent Control | 100 | 100 | 99 | 89 |

EXAMPLE 5

Fungicidal utility is demonstrated by the ability of the test compound to protect tomato plants against the late blight fungus, *Phytophthoria infestans*. The method employs tomato plants 5 to 7 inches high of the variety Bonny Best. 100 ml. of the test formulation (varying amounts of the product of Example 2-5% acetone-0.01% Triton X–155-the balance water) are sprayed on the plants at 40 lbs. air pressure while the plants are being rotated on a turntable in a spray chamber. After the spray deposit is dry, the treated plants and comparable untreated controls are sprayed with approximately 150,000 sporangia of *P. infestans* per ml. The plants are held in a saturated atmosphere for 24 hours at 60° F. to permit spore germination and infection. After 2 to 4 days, lesion counts are made on the three uppermost fully expanded leaves. The percent of disease control on the test plants obtained by comparing the number of lesions on the test plants and control plants is shown in the following table:

[Percent disease control at concentration p.p.m.]

| p.p.m. | 512 | 256 | 128 |
|---|---|---|---|
| Percent Control | 100 | 99 | 96 |

EXAMPLE 6

In order to make an in vitro evaluation of the product of Example 2 as a contact nematode poison, nematodes *Panagrellus redivivus* are exposed to the test chemical in small watch glasses (27 mm. diameter x 8 mm. deep), within a 9 cm. Petri dish. An aqueous test formulation (1000 p.p.m. of the product of Example 2-5% acetone- 0.01% Triton X–155-balance water) is used. Results are recorded 48 hours after treatment and from these it is shown that 91% of the nemotodes are killed.

EXAMPLE 7

*Preparation of 2,3,6,7-Tetrachloro-1,4-Naphthoquinone*

PART A.—WITH IODINE CATALYST

A rapid stream of chlorine gas is bubbled into a refluxing solution of 20 g. (0.088 mol) of 6,7-dichloro-1,4-naphthoquinone and 9 g. (0.035 mol) of iodine in 250 ml. of glacial acetic acid for 2.5 hours. After cooling, the solid which has separated during the reaction is filtered off and washed with acetic acid and then with methanol. The crude product is extracted with 350 ml. of methanol to leave 17.6 g. of yellow solid having a melting point of 236°–239° C., giving a crude yield of 67%. Recrystallization of this solid from a mixture of 125 ml. of dioxane and 100 ml. of normal heptane yields 2,3,6,7-tetrachloro-1,4-naphthoquinone having a melting point of 243°–244.5° C., weighing 12.6 g., which is a 48% yield. Identity of the compound is confirmed by elemental analysis:

| Element | Percent Calculated | Percent Actual |
|---|---|---|
| C | 39.82 | 40.12 |
| H | 0.68 | 0.96 |
| Cl | 47.92 | 46.8, 46.9 |

PART B.—WITHOUT CATALYST

A rapid stream of chlorine gas is passed into a solution of 20 g. (0.088 mol) of 6,7-dichloro-1,4-naphthoquinone in 500 ml. of glacial acetic acid at 80°–90° C. for a period of three hours. The crude 2,3,6,7-tetrachloro-1,4-naphthoquinone which is isolated by filtration from the cooled reaction mixture weighs 20.2 g. and melts at 213°–220° C. Melting point of a mixture of this material with an authentic sample is not depressed, thereby indicating formation of the desired compound.

EXAMPLE 8

Spore germination tests on glass slides are conducted via the test tube dilution method adopted from the procedure recommended by the American Phytopathological Society's committee on standardization of fungicidal tests. In this procedure, the product of Example 7 in aqueous formulations at concentrations of 1000, 100, 10 and 1.0 p.p.m. is tested for its ability to inhibit germination of spores from 7 to 10-day-old cultures of *Alternaria oleracea* and *Monolinia fructicola*. These concentrations refer to initial concentrations before diluting four volumes with one volume of spore stimulant and spore suspension. Germination records are taken after 20 hours of incubation at 22° C. by counting 100 spores. Results indicate that concentrations of 1 to 10 p.p.m. and 1 to 10 p.p.m. afford disease control for the *A. oleracea* and *M. fructicola*, respectively.

EXAMPLE 9

The procedure of Example 4 is followed using the product of Example 7 and shows the following disease control:

[Percent disease control at concentrations p.p.m.]

| p.p.m. | 512 | 256 | 128 | 64 |
|---|---|---|---|---|
| Percent Control | 100 | 100 | 97 | 86 |

EXAMPLE 10

The procedure of Example 5 is followed using the product of Example 7 and the percent disease control is:

[Percent disease control at concentrations p.p.m.]

| p.p.m. | 512 | 256 | 128 | 64 |
|---|---|---|---|---|
| Percent control | 96 | 51 | 72 | 60 |

EXAMPLE 11

Tomato, variety Bonny Best, plants growing in 4 inch pots are treated by pouring a test formulation (2000 p.p.m. of the product of Example 7-5% acetone-0.01% Triton X–155-balance water) around the plants into the pots at a rate equivalent to 32 lbs./acre and 16 lbs./acre. The tomato plant are 3 to 4 inches tall with the trifoliate leaves just starting to unfold at time of treatment. The tomato plants are exposed to early blight fungus 24 hours after the chemical is applied to the soil. After 10 to 14 days, observation indicates 76% and 69%, respectively, disease control by comparison to the control plants.

EXAMPLE 12

Fungicidal activity is indicated by applying the product of Example 7 to the soil surrounding 10-day-old pinto bean plants in a test formulation (2000 p.p.m. product of Example 7-5% acetone-0.01% Triton X–155-balance water). The concentration of test chemical used is equivalent to 128 lbs./acre. Immediately following application of the test chemical to the soil surrounding the plants, the plants are sprayed with a spore suspension of the rust fungus, *Uromyces phaseoli*. This spore suspension is prepared by mixing 30 mg. of freshly harvested spores with 48 mg. of talc. This is then diluted with water at the rate of about 1 mg. of the talc spore mixture to 1.7 ml. of distilled water.

After spraying the spores on the seed leaves of the bean plants, they are placed in a saturated atmosphere for 24 hours at 60° F. After incubation, the plants are removed to controlled greenhouse conditions and, 9–10 days after exposure, rust lesions are counted. The observed are converted to percentage disease control based on the number of lesions obtained on the control plants. Using this procedure, 85% disease control is observed.

It is to be understood that although the invention has been described with specific reference to particular embodiments thereof, it is not to be so limited since changes and alterations therein may be made which are within the full intended scope of this invention as defined by the appended claims.

What is claimed is:

1. The method of preparing compounds having the formula

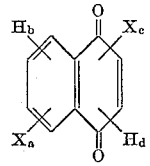

wherein X is halogen, $a=2$ to 4, inclusive, $b=4-a$, $c=0$ to 2, inclusive, and $d=2-c$, which comprises reacting a compound of the formula

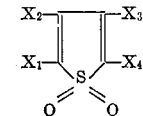

wherein $X_1$, $X_2$, $X_3$ and $X_4$ are selected from the group consisting of hydrogen and halogen, at least two X's being halogen, with benzoquinone.

2. The method of claim 1 wherein the halogen is chlorine.

3. The method of claim 1 wherein the reaction is carried out in the presence of an inert organic solvent.

4. The method of preparing 6,7-dichloro-1,4-naphthoquinone which comprises reacting 3,4-dichlorothiophene 1,1-dioxide with p-benzoquinone in the presence of an inert organic solvent.

5. The method of preparing compounds having the formula

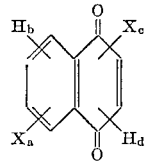

wherein X is halogen, $a=2$ to 4, inclusive, $b=4-a$, $c=1$ to 2, inclusive, and $d=2-c$ which comprises reacting a compound of the formula

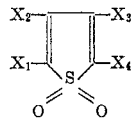

wherein $X_1$, $X_2$, $X_3$, $X_4$ are selected from the group consisting of hydrogen and halogen, at least two being halogen, with benzoquinone to form an intermediate product and reacting the intermediate product with a halogen in the presence of an inert organic solvent.

References Cited in the file of this patent

UNITED STATES PATENTS

| | | |
|---|---|---|
| 1,327,260 | Wheeler | Jan. 6, 1920 |
| 2,300,948 | Lontz | Nov. 3, 1942 |
| 2,322,759 | Lontz | June 29, 1943 |
| 2,349,772 | Der Horst | May 23, 1944 |
| 2,396,665 | Ladd | Mar. 19, 1946 |
| 2,773,883 | Gaetner | Dec. 11, 1956 |
| 2,829,082 | O'Brien | Apr. 1, 1958 |
| 2,886,577 | Fan | May 12, 1959 |
| 2,935,518 | Reetz | May 3, 1960 |
| 2,975,196 | Sjostrand | Mar. 14, 1961 |

FOREIGN PATENTS

| | | |
|---|---|---|
| 870,997 | Germany | Mar. 19, 1953 |

OTHER REFERENCES

Elsevier: Encyclopedia of Organic Chemistry, vol. 12B, p. 2924, p. 2926, and p. 2927.

Bertheim: Chem. Ber., vol. 34, p. 1554 (1901).

Brass et al.: Chem. Ber., vol. 55 (1922), p. 2554.